May 21, 1963 H. W. KIMBALL 3,090,370
COMBUSTION ENGINE VALVE
Filed April 4, 1962

INVENTOR.
HAROLD W. KIMBALL
BY
Chester W. Brown
ATTORNEY 3,090,370
COMBUSTION ENGINE VALVE
Harold W. Kimball, 2738 N. 87th St., Milwaukee, Wis.
Filed Apr. 4, 1962, Ser. No. 185,160
4 Claims. (Cl. 123—188)

This invention relates to improvement in intake and exhaust valves for an internal combustion engine whereby the speed of entrance of combustible fuel and air mixture into the combustion chamber and the expelling of the burned mixture therefrom is increased above a speed produced by normal operation of the engine.

I am aware that many devices have been devised for the purpose of obtaining a better mixing of fuel and air while entering a combustion chamber. Although these devices appear to be quite efficient for the purpose, I am not aware of any that perform this function and at the same time increase the speed of entrance into and density of the mixture within the combustion chamber and then expell the burned mixture more speedily than normal and produce a greater rarity within the chamber than that normally produced by the pressure of the hot burned gas.

It is, therefore, the principal object of this invention to provide an intake valve for a combustion engine with means for rotatably-oscillating the valve and including means for impelling the combustible mixture into the combustion chamber at a speed greater than normally produced by a partial vacuum within the chamber and at the same time create a turbulence in the mixture that will insure a thorough mixing of the fuel and air prior to ignition thereof.

It is also an object to provide a valve embodying the foregoing means which may be utilized as an exhaust valve, the aforesaid means comprising impelling means on the under and upper sides of the valve appropriately curved radial of the axis of the valve to impel gaseous material radially outward of said axis.

More specifically, it is an object to provide a reciprocable-oscillatable valve having means designed to increase the speed of entrance of combustible gases into a combustion chamber, thereby obtaining a higher concentration of combustible gases in the chamber while being compressed.

Further, more specifically, it is an object to provide a reciprocable-oscillatable valve having means designed to increase the speed of egress of spent combustible gases from a combustion chamber, thereby obtaining a more rarified condition within the chamber prior to the entrance of combustible gases thereinto.

Another object is to provide a valve embodying the foregoing means and adapted for use as an intake valve or an exhaust valve.

Further amplifying the above statement of object, it is the primary object of this invention to provide a valve for an internal combustion engine which produces, not only the ancillary results of gas disturbance by positive mechanical motivation, a higher density of gases in a combustion chamber prior to compression movement of the piston and a lower density of the gases in the combustion chamber at the end of the exhaust movement of the piston.

These and other objects will become apparent as the following description of the drawings progresses.

In the drawings

Figure 1:
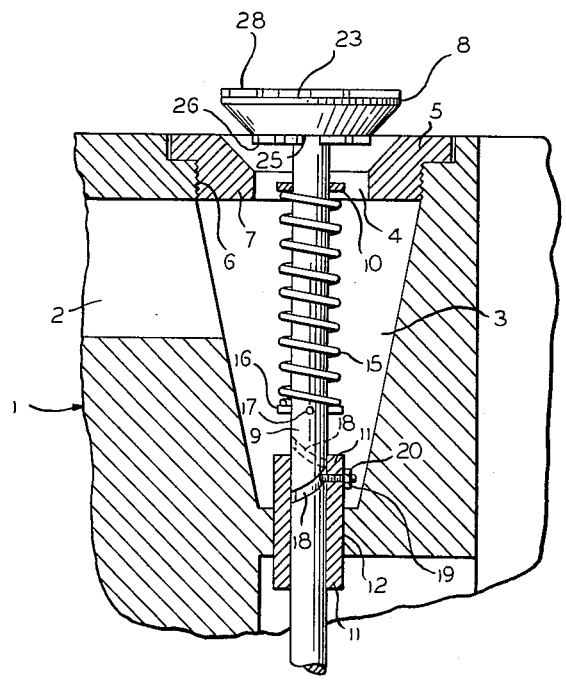
FIG. 1 is a fragmentary-sectional view of an internal combustion engine taken in a plane substantially coinciding with the axis of the valve stem.

In FIG. 1 the cylinder block 1 is provided with a port 2 which, for the present may be considered as an intake port communicating with the inverted frusto-conical area which in turn communicates with the combustion chamber through the valve seat opening 4, in the valve seat 5, the cylinder head not being shown. As indicated the valve seat 5 is secured in position by means of threads 6 on the cylindrical portion 7 and complementary to threads on the block 1.

As indicated in FIG. 1, the valve 8 is shown in open position to permit combustible gases to enter the combustion chamber through the port 2, area 3 and opening 4. The valve 8 is provided with a valve stem or rod 9 extending downwardly through the guide plate 10 secured in any suitable manner (not shown) to the valve seat 5 within the opening 4, then extending downwardly through the guide sleeve 11 to a point (not shown) for engagement with a valve operating cam (not shown). The guide sleeve 11 is secured to the block 1 at the lower end of the area 3 by any suitable means, as by complementary threads at 12 on the sleeve and block. A coil spring 15 surrounds the stem 9 and is positioned between guide plate 10 and pins 16—17 which extend transversely through stem. The spring 15 is thus held under compression and biases the valve 8 to closed position through the stem 9 when the cam (not shown) permits the valve 8 to be thus moved.

The valve stem or rod 9 is provided, in its periphery, with spiral groove 18 and a pin 19 threaded through the side of the guide sleeve 11 extends into the groove and is secured against movement by means of lock or jam nut 20. It will be apparent that rod 9 and valve 8 will be oscillated by means of the pin 19 as the rod reciprocates under the influence of the cam (not shown). As the valve 8 moves downwardly toward the valve seat, the pin 19 causes it to rotate in a clock-wise direction relative to FIG. 3 or counter clock-wise relative to FIG. 4, as indicated by the arrows A and A', respectively. Conversely, as the valve 8 is moved from closed position to the open position shown in FIG. 1, it will be rotated by the pin 19 in a counter clock-wise direction relative to FIG. 3 or clock-wise direction relative to FIG. 4, as indicated by the arrows B and B', respectively.

The underside 25 of the valve 8 is provided with a plurality of equally spaced fins or ribs 26. Although the illustration of the curvature of the ribs 26 is not to be taken as the ideal, it will be understood that the curvature will be such as may be determined from the speed of rotation of the valve 8 caused by the pin 19 and spiral angle of the groove 18. In any event the curvature of the ribs should be such that they will cause unburned fuel mixture to be impelled radially of the valve and into the gas chamber at a speed much in excess of that normally produced by the partial vacuum induced by piston movement. Thus there will be created within the combustion chamber, a higher concentration of combustible gas as the piston starts its compressing cycle.

The upper side 27 of the valve 8 is provided with a plurality of equally spaced fins or ribs 28. The curvature of the ribs 28 is such that upon opening movement of the valve, the unburned gases will be entrained and impelled toward the axis of the valve 8 and thereby assist the ribs 26 in concentrating the gases in the combustion chamber prior to the compressing movement of the piston.

The description supra has been directed to valve 8 when in use as an intake valve. I will now refer to the valve 8 as an exhaust valve and describe its mode of operation when used as such.

The prior description is heretofore fully disclosed and is applicable to the valve when in use as an exhaust valve, the only difference being that in the FIG. 1 view the valve is in open position for exhausting burned gases and will be in closed position on the valve seat 5 during the admission, compression and expansion cycles.

Figure 3:
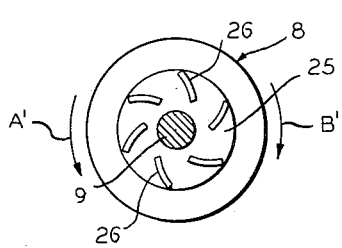
FIG. 3 is a top plan view of the valve head shown in FIG. 2 as indicated by the numerals 3—3.
Figure 2:
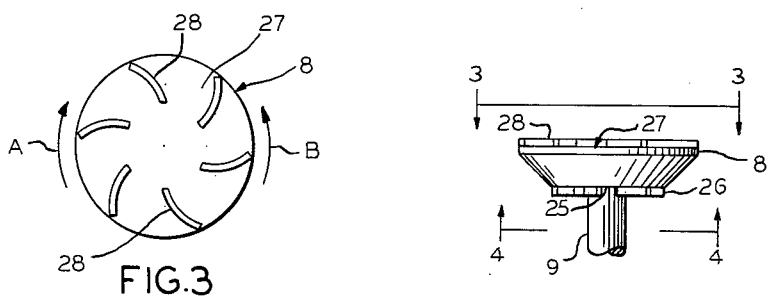
FIG. 2 is a fragmentary view of the valve head and stem shown in FIG. 1.
Figure 4:
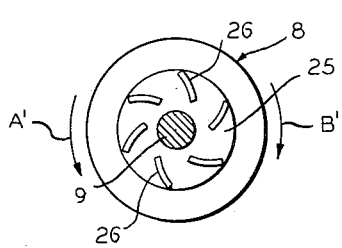
FIG. 4 is a bottom view of the valve head, taken on the line 4—4 in FIG. 2.

When the valve 8 is moving to closed position, it will, by reason of the engagement of the pin 19 in the spiral groove 18, be rotated in a clockwise direction as indicated by the arrow A in FIG. 3 or a counter-clockwise direction as indicated by the arrow A' in FIG. 4. When thus rotated, the arcuate ribs 28 on the upper side 27 of the valve will entrain the burned gases and impell them radially outward of the valve. At the same time the arcuate ribs 26 on the under side 25 of the valve will entrain the burned gases and cause them to flow radially inward of the valve 8 and outwardly through opening 4 in the valve seat 5, the opening 4, area 3 and port 2 which may be jointly considered as an exhaust port.

Although I have not indicated the critical curvature of the impelling ribs 26 and 28, it will be understood by those skilled in the art, that the curvature should be co-related to the speed of rotation and reciprocation of the valve, the primary consideration being that the ribs should augment the normal speed of the gases produced by the partial vacuum in the cylinder when the valve is in use as an intake valve or by pressure within the cylinder when the valve is in use as an exhaust valve.

From the foregoing it will be apparent that I have provided a reciprocable, rotatable valve for an internal combustion engine with means which augments the speed of gases past the valve over that normally produced as an inherent characteristic of the engine.

It will also be apparent that I have provided a valve with means that aid in increasing the density of unburned gases when in use as an intake valve.

It will be further apparent that I have provided a valve with means that aid in exhausting burned gases when in use as an exhaust valve, thereby more thoroughly evacuating the burned gases prior to the admission and compression of unburned gases.

I have also provided a valve which may, alternatively, be utilized as either an intake or an exhaust valve in an internal combustion engine and with gas impelling means which will speed the flow of gases past the valve head.

The foregoing disclosure brings to light a novel invention wherein a valve for an internal combustion engine is oscillatable upon reciprocation and is provided with gas impelling ribs or fins which, as an intake valve augments the flow of the gas into and increases the density of the gas in the combustion chamber prior to the compression stroke and which as an exhaust valve augments the flow out of and lowers the vacuum in a combustion chamber subsequent to an exhaust stroke of the piston.

Although I have disclosed a specific form of my invention, it will be understood that I desire to reserve to myself any modifications that may come within the scope of the following claims.

I claim:

1. In an internal combustion engine including a cylinder block having a combustion chamber, a gas passage in said block communicating with the chamber and a valve seat in said block disposed between said chamber and passage, the combination of a valve complementary to said valve seat, guide means in said block, said valve having a valve stem integral therewith and slidably and rotatably mounted in said guide means, said stem having a groove in its periphery extending spirally relative to the axis thereof, pin means carried by said guide means and extending into said groove, whereby when said stem moves longitudinally relative to its axis it will be caused to simultaneously rotate, means for reciprocating said stem, said valve having upper and lower sides, and arcuate ribs on each of said sides extending in a radial direction relative to said stem, whereby gases passing said valve will be entrained by said ribs and positively impelled at an augmented speed, whereby the density of gases in said combustion chamber may be increased prior to compression and decreased subsequent to exhaustion.

2. A valve for an internal combustion engine, said valve including a valve stem integral therewith, said valve having an upper and lower surface, each provided with arcuate ribs extending in a direction radially of the axis of said stem, in combination with means for reciprocating and rotating said valve simultaneously, whereby gases passing said valve will be impelled by said ribs and positively impelled at an augmented speed.

3. In an internal combustion engine having a valve seat and valve guide means for reciprocably receiving a valve stem and including means interacting with said valve stem for oscillating said valve stem upon reciprocation thereof; a valve complementary to said seat and having upper and lower sides and a valve stem slidable and reciprocable in said guide means, in combination with a set of arcuate ribs on each of said sides, said ribs extending radially relative to the axis of said stem, the curvature of said ribs relative to said axis being such as to positively impel gases passing said valve and thereby positively augment the speed of said gases.

4. A valve for an internal combustion engine including a valve stem having a spiral groove in its periphery, said valve having upper and lower surfaces disposed radially relative to said stem, in combination with a set of arcuate ribs on each of said surfaces extending radially relative to said stem, the direction of curvature of said ribs and the spiral direction of said groove toward said valve being in the same general direction about the axis of said stem, whereby said valve is simultaneously reciprocated and oscillated and said ribs caused to positively impel gases past said valve at an accelerated speed.

References Cited in the file of this patent

UNITED STATES PATENTS

| | | |
|---|---|---|
| 1,160,028 | Wright | Nov. 9, 1915 |
| 1,550,530 | Flynn et al. | Aug. 18, 1925 |

FOREIGN PATENTS

| | | |
|---|---|---|
| 718,970 | Germany | Mar. 25, 1942 |